May 9, 1961  A. E. ANNETT ET AL  2,983,188
OPTICAL COMPARATOR AND SHUTTER DEVICES THEREFOR
Filed Jan. 6, 1958  2 Sheets-Sheet 1
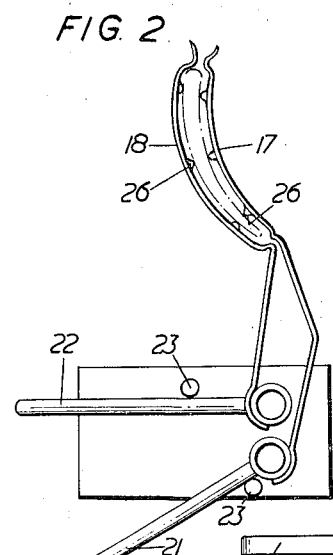
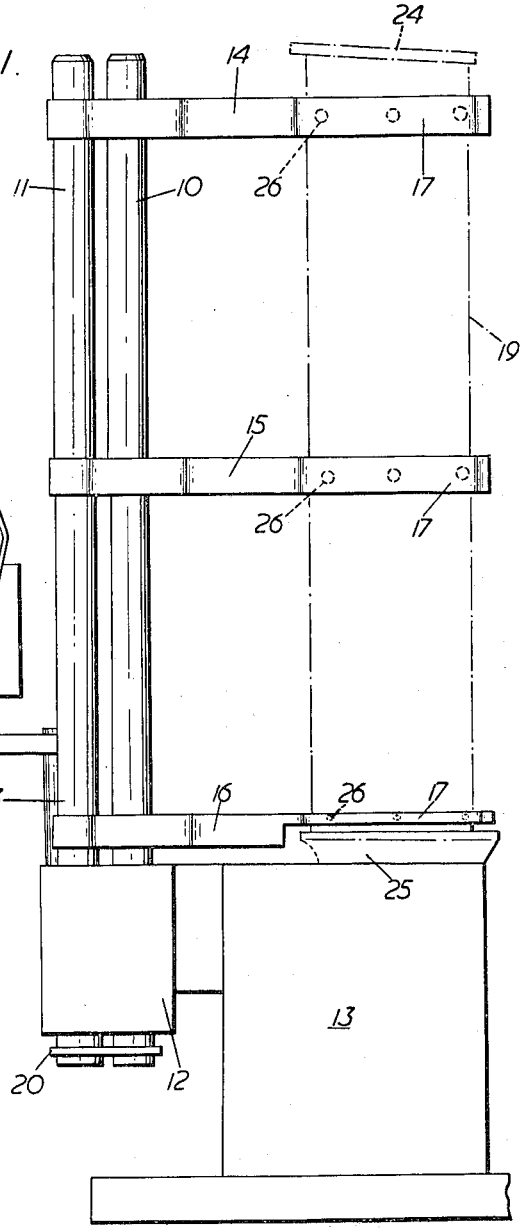
*Inventors*
*Albert E. Annett*
*Christopher L. Bartlett*
By
*Attorneys*

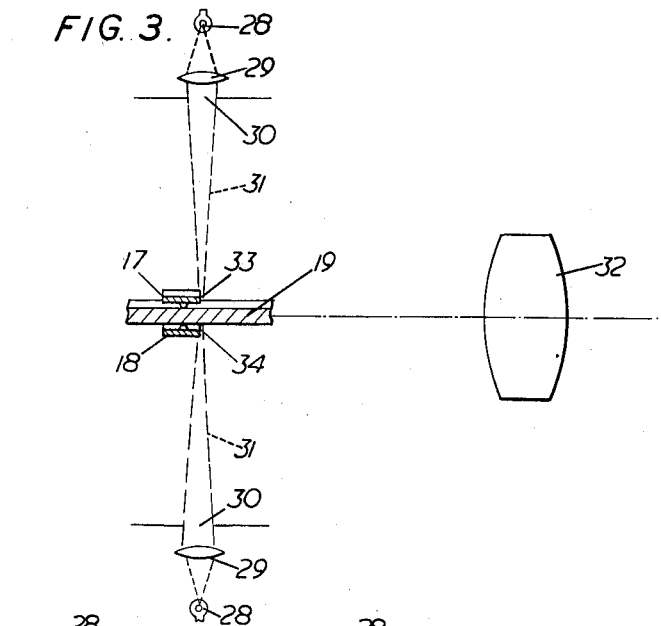
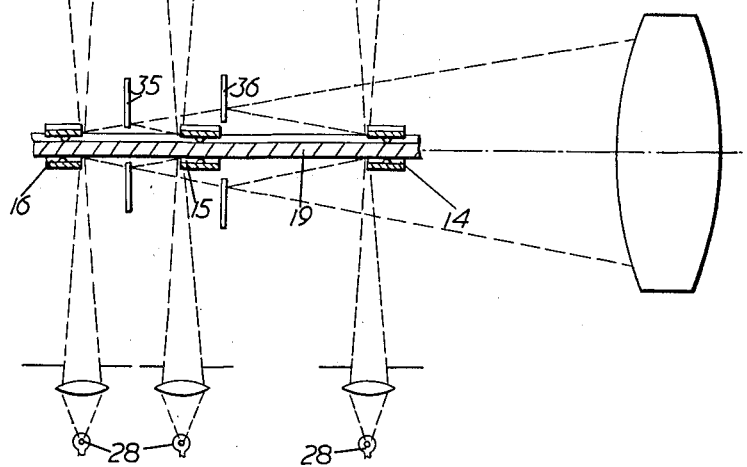

United States Patent Office 2,983,188
Patented May 9, 1961

2,983,188

OPTICAL COMPARATOR AND SHUTTER DEVICES THEREFOR

Albert Edward Annett and Christopher Leslie Bartlett, Bristol, England, assignors to Taylor, Taylor & Hobson Limited, Leicester, England, a company of Great Britain Filed Jan. 6, 1958, Ser. No. 707,356

Claims priority, application Great Britain Jan. 8, 1957

14 Claims. (Cl. 88—24)

This invention relates to a shutter device for use in testing the profile of sections of a body and also to optical projection apparatus for testing section profiles in which such shutter device is employed. The shutter device is especially useful in optical projection apparatus wherein an enlarged image of a section profile of a body, such for example as a compressor blade or a turbine blade, is projected on to a screen for inspection purposes.

The invention has for its object to provide a shutter device by means of which an enlarged and well-defined image of a desired profile section can be obtained, even with a body which is normally difficult to test accurately, such for example as a compressor blade or turbine blade of widely varying cross-section and twist, and also to provide improved optical projection apparatus incorporating such shutter device.

The shutter device according to the present invention comprises a group of shutter elements each having an operating edge, means for moving the shutter elements into an operative configuration in which such shutter elements embrace the test body, and means for maintaining the operative edges of the shutter elements at a small substantially constant spacing from the surface of the test body when such body is embraced by the shutter elements so that such operative edges delineate an individual section of the body whose profile it is desired to project. It is to be understood that the word "embrace" as used herein is not intended in any way to be limited to complete enclosure or to total surrounding of the test body or any section thereof, but is also intended to include the case in which the shutter elements only partly surround the test body or a section thereof.

According to a further feature of the invention, for testing a plurality of section profiles, the shutter device comprises a plurality of groups of shutter elements which can be moved into operative configurations such that the operative edges of the shutter elements of each group delineate one of a plurality of sections of the body.

Conveniently, the shutter device may include a shutter support for carrying the group or groups of shutter elements such that the shutter elements are rotatable about one or more pivot axes into and out of their operative positions.

The group or each group of shutter elements is preferably constituted by a pair of shutter elements in the form of appropriately curved vanes. In this case, when a shutter support is employed for carrying a plurality of pairs of shutter elements, such shutter support preferably comprises a a pair of closely spaced parallel rotatable shafts on which the shutter elements are carried in pairs spaced apart along the length of such shafts, the two shutter elements of a pair being mounted respectively on the two shafts, whereby the movement of the shutter elements into and out of their operative configurations can be effected by rotation of the shafts.

Preferably, the means for maintaining the spacing between each shutter element and the test body comprises a plurality of spacer elements carried by the inner side of such shutter element.

A further feature of the invention concerns optical apparatus for testing section profiles and comprises, in combination with the shutter device above described, illuminating means providing beams of light incident on the test body past the operative edges of the shutter elements of the group or of each group thereof so as to provide one or more profile delineating boundaries between illuminated and non-illuminated areas on the surface of the test body, and optical projecting apparatus for producing an image of the delineated section profile or profiles on a projection screen.

The invention may be carried into practice in various ways but a preferred construction of shutter device and a preferred arrangement of optical projection apparatus employing such shutter device according thereto will now be described with reference to the accompanying drawings, in which Figure 1 is a side view of the preferred construction of shutter device in use for testing a turbine blade mounted in a blade holder, Figure 2 is a plan view corresponding to Figure 1 with the blade holder omitted for clarity, Figure 3 shows diagrammatically an optical arrangement incorporating a shutter device having a single pair of shutter elements, and Figure 4 shows diagrammatically an optical arrangement incorporating the preferred shutter device for use in simultaneously projecting three section profiles.

The preferred shutter device is employed in optical projecting apparatus (to be later described) in which an enlarged image of a section profile of the test body is projected on to a projection screen for inspection purposes. The projection screen may conveniently be marked with a master layout of the section profile with which the projected image may be compared.

As shown in Figures 1 and 2, the preferred shutter device comprises a shutter support consisting of two parallel pillars 10 and 11 mounted for part rotation in an attachment block 12 which is secured by screws or other suitable means to a support for the test body. Such support may for example consist of a blade holder 13 for supporting a turbine blade 19 (indicated by the broken lines). The pillars 10 and 11 support three shutters 14, 15 and 16 which are spaced apart along and project laterally from one side of the support. Each shutter consists of a pair of shutter elements 17 and 18 each having a well-defined operative edge. In use, the operative edges of each shutter 14 or 15 or 16 are coplanar and delineate a plane section of the turbine blade 19 whose profile it is idesired to project. One shutter element 17 of each pair thereof is mounted on one pillar 11 and the other shutter element 18 of each pair is mounted on the other pillar 10. The shutter elements 17 and 18 are preferably in the form of somewhat flexible vanes of slightly springy material and project from the shutter support to embrace the turbine blade 19 around three sections thereof whose profiles are to be projected.

The lower ends of the pillars 10 and 11 are connected by a C-shaped spring 20 which tends to maintain the shutters 14, 15 and 16 in their closed position (in which the shutter elements 17 and 18 embrace the turbine blade 19), and the pillars 10 and 11 are provided with two hand levers 21 and 22 by operation of which the pillars can be rotated through a part revolution against the action of the spring 20 to force apart the shutter elements 17 and 18. Stops 23 are provided to limit the rotation of the pillars 10 and 11 and thus prevent possible damage to the shutter elements 17 and 18.

The shapes of the shutter elements 17 and 18 are such that each shutter 14 or 15 or 16, in its closed or operative position, encloses a space generally corresponding in shape to one of the section profiles of the blade 19 which it is desired to project. The spacing of the shutters 14, 15 and 16 along the shutter support is arranged so that each shutter will embrace that portion of the blade 19 immediately next to the section whose profile is to be projected. In Figure 1 the shutters 14, 15 and 16 are shown to embrace the blade 19 at three positions, adjacent to the blade shroud 24, adjacent to the blade platform 25 and at an intermediate position. The shutter 16 adjacent to the blade platform is partly cut away to avoid such blade platform. The operative edges of the shutters in each case are the edges furthest away from the blade holder 13.

It will be clear, however, that if the operative edges of the shutter elements 17 and 18 were to contact or to be too close to the surface of the blade 19 the projected image would tend to become confused, owing to the close proximity of the images of the shutter edge, the shadow thereof on the blade surface and possibly also the reflected image of the blade edge in the blade surface, if such surface has not been rendered adequately non-reflecting by painting or inking. Accordingly, the inner surfaces of the shutter elements 17 and 18 are provided with spacer elements in the form of inwardly projecting pips or protuberances 26 which are located close to but sufficiently spaced from the operative edges of the shutter elements 17 and 18, not to interfere with the projection of the image of the section profiles. The operative edges of the shutters 14, 15 and 16 are thus maintained at a small but constant spacing from the surface of the blade 19. The constant small spacing of the operative shutter edges from the blade surface ensures that in use there will be well-defined boundaries between the illuminated and non-illuminated areas of the blade surface due to the shadow of the shutter edges and that the image of the shutter edges themselves will be clearly distinguishable from the image of such boundaries on the projection screen. Errors due to reflection from the blade surface can be completely avoided provided that such normally light-reflecting surface is completely and uniformly painted over so as to render it light-diffusing but non-reflecting. The images on the projection screen are used to test profile errors by comparison between such images and the master layout on the screen.

Having described the preferred construction of shutter device, one convenient arrangement of optical projecting apparatus, in which such device may be used, will now be described with reference to Figure 3. This figure shows, for simplicity, the use of a shutter device employing only a single shutter. The drawing shows a partial longitudinal section through the turbine blade or other test body 19, so that the plane of the paper is at right angles to the section whose profile is to be projected and also contains the optical axis of the projection objective diagrammatically indicated at 32. The sectional view of the two shutter elements 17 and 18 clearly shows their spacing from the surface of the test body 19 as determined by the spacer pips 26. The operative edges 33 and 34, respectively of the two shutter elements 17 and 18, of course lie in the plane of the section whose profile is to be projected, and the illuminating units, which together constitute the illuminating means, have their optical axes in such plane. There may be two or more such illuminating units disposed in suitable positions around the test body, but in many instances it will be found sufficient to employ two units only, on opposite sides of the test body. Each illuminating unit comprises a bright source of light 28 of convenient size, a lens 29 for directing a beam of light from such source on to the operative edge or edges 33 or 34 of the shutter elements, and a stop 30 in the form of a slit parallel to the plane of the section. Owing to the fact that the spacing of the shutter elements from the surface of the test body 19 is small, a very sharp shadow of the operative edge can be obtained on the surface of the test body, without the necessity of using a parallel beam of light (as would have been required with greater spacing of the shutter elements from the test body), and in order to concentrate maximum light on the surface of the test body, the lens 29 is arranged to focus an image of the source 28 on such surface. Half the width of such image appears on the surface of the test body, whilst the other half is cut off by the shutter element or elements, leaving a well-defined boundary between the bright area and the dark area on the surface of the test body, such boundary serving to define the section profile.

The projection objective 32, which will usually need to be well-corrected over a wide aperture, serves to project on to a projection screen (not shown) an image of the section profile thus defined. An image of the operative edges of the shutter elements will also appear on the screen, surrounding the image of the dark-light boundary defining the section profile, and there will be a dark area between the two images, the area within the inner image (or part thereof) appearing bright, as also part of the area outside the outer image. Whilst it would, of course, be possible to make measurements of the image of the shutter edges, it is obviously more satisfactory to confine all measurements to the inner image, which is a true image of the section profile itself. In practice, it will often be convenient to provide a master drawing of the correct section profile on the projection screen, so that the image obtained can be directly compared with such master drawing.

There must of course be provision in the well-known manner for relative adjustment between the various parts of the projecting apparatus to ensure accurate focussing of the images on the projection screen, not only of one section profile, but also (in the case of the preferred construction of shutter device above described) of the other two section profiles. This can be achieved in various ways. Thus, there may be a single illuminating means which remains stationary relatively to the projection objective and screen, such illuminating means defining the object plane of the projection objective conjugate with the image plane of the projection screen. In such case, the blade holder 13, carrying the test body 19 and also the shutter support 10, 11, will be so mounted that it can be moved axially, to bring the operative edges of the three shutters in turn into the illuminated object plane.

It is also possible to effect simultaneous projection of two or more section profiles. Thus, for instance, as shown in the arrangement of Figure 4, which uses the shutter device illustrated in Figures 1 and 2, and employs a separate illuminating device 28 for each of the three shutters 14, 15 and 16, the operative edges of the shutter elements of the shutters 14 and 15, however, being on the sides of those shutter elements nearer to the shutter 16, it then becomes practicable to effect simultaneous projection of the three section profiles of the test body 19 so defined, by providing, in the manner more fully described in the specification of United States Letters Patent No. 2,741,153, a semi-transparent reflector 35 midway between the facing operative edges of the shutters 15 and 16 and another semi-transparent reflector 36 midway between the operative edges of the shutters 14 and 16. In this way, reflected images of the section profiles defined by the shutters 14 and 15 are superimposed on the plane of the section profile defined by the shutter 16, so that with such plane as the object plane of the projection objective 32 conjugate with the image plane of the projection screen, it will be clear that the images of the three section profiles are superimposed on the screen. Conveniently, the semi-transparent mirrors 35 and 36 may each be formed in two parts respectively carried by the shutter support 10 and 11, one part on each pillar thereof, so that when the shutters are moved into their closed positions the parts of each mirror are likewise moved together into positions adjacent to the test body 19.

This arrangement has the advantage, not only of giving simultaneous projection of two or more section profiles, but also of making it more readily possible to use axial projection by means of a projection objective 32 having its optical axis at right angles to the planes of the three sections, in the manner shown in Figure 4, even when the test body, as is often the case with turbine blades, has a projecting obstruction at its tip. If such obstruction happens to be large, it may prove uneconomical to employ axial projection at all, in view of the very large aperture needed for the projection objective and of the fact that it is only the oblique marginal rays which can be usefully employed. In such case, it is quite practicable to employ oblique projection for projecting the image of the section profile or profiles, care being taken in any of the well-known manners to compensate for the distortion of the image due to such oblique projection.

It will be appreciated that the above described shutter device is not to be considered limited to use in the described optical projection apparatus and furthermore that the preferred construction of shutter device may be modified in various ways within the scope of the invention. For example, instead of rigidly mounting each shutter element on a rotatable shaft, each shutter element may be pivoted to a support shaft, so that it can be rotated about the shaft into its operative position. In this case, a locking device, such for example as a thumb screw, may be provided to maintain such shutter element in its operative position.

What we claim as our invention and desire to secure by Letters Patent is:

1. For use in optical apparatus for testing a section profile of a body, a shutter device for intercepting illuminating beams directed on to the surface of the body, comprising a group of shutter elements each having an operative edge, means for moving the shutter elements into an operative configuration in which such shutter elements closely embrace the test body whereby the shadows of their operative edges delineate the section of the body whose profile it is desired to project, and small spacer elements carried by the shutter elements and acting when the body is embraced by the shutter elements to engage with the surface of the body and thereby to maintain a small substantially constant spacing between the operative edges of the shutter elements and the surface of the test body just sufficient to ensure a clearly visible distinction between such operative edges and their shadows.

2. A shutter device as claimed in claim 1 including a shutter support for carrying the group of shutter elements, such shutter support including means for permitting rotation of the shutter elements about at least one pivot axis into and out of their operative positions.

3. A shutter device as claimed in claim 1, in which the group of shutter elements is constituted by a pair of shutter elements in the form of appropriately curved vanes.

4. For use in optical apparatus for testing spaced section profiles of a body, a shutter device for intercepting illuminating beams directed on to the surface of the body, comprising a plurality of groups of shutter elements, each of such elements having an operative edge, means for moving the shutter elements of the groups into operative configurations in which such shutter elements closely embrace spaced portions of the test body according to their respective groups whereby the shadows of the operative edges of the shutter elements of each group delineate one of the sections of the body whose profiles it is desired to project, small spacer elements carried by the shutter elements and acting when the body is embraced by the shutter elements to engage with the surface of the body and thereby to maintain a small substantially constant spacing between the operative edges of the shutter elements and the surface of the test body just sufficient to ensure a clearly visible distinction between such operative edges and their shadows.

5. A shutter device as claimed in claim 4 including a shutter support for carrying the groups of shutter elements, such shutter support including means for permitting rotation of the shutter elements about at least one pivot axis into and out of their operative positions.

6. A shutter device as claimed in claim 5, in which each group of shutter elements is constituted by a pair of shutter elements and the shutter support comprises a pair of closely spaced parallel rotatable shafts for carrying the shutter elements with the pairs thereof spaced apart along the lengths of the shafts, the two shutter elements of a pair being mounted respectively on the two shafts and the means for moving the shutter elements comprising means for rotating the shafts, whereby the shutter elements can be moved into and out of their operative positions.

7. A shutter device as claimed in claim 4, in which each group of shutter elements is constituted by a pair of shutter elements in the form of appropriately curved vanes.

8. Optical apparatus for testing a section profile of a body, comprising illuminating means for directing beams of light towards the surface of the test body in the neighborhood of the section whose profile is to be tested, focussing means for focussing such beams of light on the surface of the test body, a group of shutter elements each having an operative edge for intercepting an illuminating beam, means for moving the shutter elements into an operative configuration in which such shutter elements closely embrace the test body whereby the shadows of their operative edges delineate the said section of the body, small spacer elements carried by the shutter elements and acting when the body is embraced by the shutter elements to engage with the surface of the body and thereby to maintain a small substantially constant spacing between the operative edges of the shutter elements and the surface of the test body just sufficient to ensure a clearly visible distinction between such operative edges and their shadows, and optical projecting means for projecting an image of the delineated section profile.

9. Optical apparatus as claimed in claim 8, including a shutter support for carrying the group of shutter elements, such shutter support including means for permitting rotation of the shutter elements about at least one pivot axis into and out of their operative positions.

10. Optical apparatus as claimed in claim 8, in which the group of shutter elements is constituted by a pair of shutter elements in the form of appropriately curved vanes.

11. Optical apparatus for testing spaced section profiles of a body, comprising illuminating means for directing beams of light towards the surface of the body in the neighborhood of the sections whose profiles are to be tested, focussing means for focussing such beams of light on the surface of the test body, a plurality of groups of shutter elements each of such shutter elements having an operative edge for intercepting an illuminating beam, means for moving the shutter elements of the groups into operative configurations in which such shutter elements closely embrace spaced portions of the test body according to their respective groups whereby the shadows of the operative edges of the shutter elements of each group delineate one of the sections of the body whose profiles are to be tested, small spacer elements carried by the shutter elements and acting when the body is embraced by the shutter elements to engage with the surface of the body and thereby to maintain a small substantially constant spacing between the operative edges of the shutter elements and the surface of the test body just sufficient to ensure a clearly visible distinction between such operative edges and their shadows, and optical projecting means for projecting an image of the delineated section profiles.

12. Optical apparatus as claimed in claim 11, including a shutter support for carrying the groups of shutter elements, such shutter support including means for permitting rotation of the shutter elements about at least one pivot axis into and out of their operative positions.

13. Optical apparatus as claimed in claim 12, in which each group of shutter elements is constituted by a pair of shutter elements and the shutter support comprises a pair of closely spaced parallel rotatable shafts for carrying the shutter elements with the pairs thereof spaced along the lengths of such shafts to suit the positions of the spaced sections whose profiles are to be tested, the two shutter elements of a pair being respectively mounted on the two shafts, and the means for moving the shutter elements comprising means for rotating the shafts, whereby the shutter elements can be moved into and out of their operative positions.

14. Optical apparatus as claimed in claim 11, in which each group of shutter elements is constituted by a pair of shutter elements in the form of appropriately curved vanes.

References Cited in the file of this patent

UNITED STATES PATENTS

| | | |
|---|---|---|
| 2,737,080 | Mottu | Mar. 6, 1956 |
| 2,741,153 | Reason et al. | Apr. 10, 1956 |
| 2,747,463 | Biggs | May 29, 1956 |
| 2,748,490 | Tandler | June 5, 1956 |
| 2,795,995 | Razdow | June 18, 1957 |
| 2,835,983 | Razdow | May 27, 1958 |
| 2,867,149 | Goddard | Jan. 6, 1959 |